Patented Aug. 9, 1932

1,871,050

UNITED STATES PATENT OFFICE

SAMUEL S. EVELAND, OF PHILADELPHIA, PENNSYLVANIA

METHOD OF MULCHING

No Drawing. Application filed October 31, 1930. Serial No. 492,617.

The object of my invention is to produce an improved mulch for use in the protection of growing plants. My improvement consists in applying any of the wet pulps from which paper is made, such as wood, paper or other pulp to the ground surrounding a growing plant either by means of a trowel or by a suitable apparatus for spraying wood pulp or otherwise.

At present it is known to surround plants with a suitable paper which retains moisture in the ground but which prevents the growth of weeds and undesired plants in proximity to the plant whose growth it is desired to stimulate. This paper is somewhat fragile and delicate and is therefore not very durable, being readily destroyed by animals or insects, blown away by the wind or washed away by heavy rains. It is difficult to cut and fit this paper around the plants and it must be retained in place by putting stones or weights on it or by thrusting sticks through it or in some other way. My improvement consists in applying paper pulp directly to the soil surrounding the plant so that it is easily applied and at the same time remains firmly in position. If the paper pulp sticks to the plant stalk it does no harm and eventually it can be turned in and is fertilizer. It takes hold at once and the inequalities of the soil tend to hold it down, while it is easily applied. It is best applied by a spray but can be put on by hand, trowel or any other way.

Suitable for my purpose are many types of paper pulp. The pulp is prepared in a wet condition and is then applied to the ground surrounding the plant either by means of a trowel or by spraying on the ground with apparatus suitable for that purpose. The wood pulp may be applied to any ground surrounding a plant either out of doors in a garden or indoors in a greenhouse or pot.

If desired the wood pulp may be tinted or colored so as to permit the passage of certain rays and to be opaque to other rays.

An additional advantage of my invention is that the wood pulp may be prepared by mixing a poison or insecticide, such as lead arsenate, with it so that insect pests, for example, Japanese beetles are kept away from the growing plants.

It will be obvious that my pulp may be applied either wet or dry.

I do not intend to be limited in the practice of my invention save as the scope of the prior art and of the attached claims may require.

I claim:

1. A method of cultivating growing plants which consists in applying a mulch of wet pulp from which paper is made to the ground surrounding a plant.

2. A method of cultivating growing plants which consists in applying by means of a spray a mulch of wet pulp from which paper is made to the ground surrounding a plant.

SAMUEL S. EVELAND.